United States Patent [19]

Mitchell et al.

[11] Patent Number: 4,564,525
[45] Date of Patent: Jan. 14, 1986

[54] CONFECTION PRODUCTS

[76] Inventors: Cheryl R. Mitchell; Pat R. Mitchell, both of 446 N. Powers, Manteca, Calif. 95336; William A. Mitchell, 175 Jacksonville Rd., Lincoln Park, N.J. 07035

[21] Appl. No.: 595,280

[22] Filed: Mar. 30, 1984

[51] Int. Cl.[4] ............... A23G 1/00; A23G 3/00
[52] U.S. Cl. .................... 426/104; 426/660; 426/615; 426/803; 426/639; 426/613; 426/590; 426/579; 426/565; 426/658
[58] Field of Search ............ 426/658, 660, 593, 594, 426/579, 595, 803, 615, 631, 104, 639, 655, 613, 565, 590

[56] References Cited

U.S. PATENT DOCUMENTS 1,189,132 6/1916 Kellogg .................. 426/596
4,283,432 8/1981 Mitchell ................. 426/594

FOREIGN PATENT DOCUMENTS 672081 10/1963 Canada .................. 426/593

OTHER PUBLICATIONS

Minifie, Chocolate, Cocoa and Confectionery, Avi Pub. Co., Westport, Conn., 1980, pp. 208–214, 185–194, 200,225,249.

*Primary Examiner*—Jeanette M. Hunter
*Attorney, Agent, or Firm*—John A. Bucher

[57] ABSTRACT

Confections produced from flavor powders obtained from powdered roasted syrup of dahlia tubers. These dahlia flavored powders can be used to replace cocoa powder. When milled with a confectioner fat, the dahlia flavored powders produce a confection similar to chocolate. The powders can also be blended with protein, milk solids, fiber, carbohydrates such as starches, bland flours and sugars to produce flavor mixes which may be used as a direct replacement for cocoa powder and which can be ground with cocoa butter or a confection fat to produce chocolate-like confections. Foods incorporating these confections such as beverages, baked goods, desserts, icings, coatings, candies, syrups or ice cream are similar to analogous products made with natural cocoa or chocolate.

31 Claims, No Drawings

CONFECTION PRODUCTS

BACKGROUND OF THE INVENTION

The present invention relates to confection products and more particularly to confection products including flavor powders formed from dahlia bulbs.

Chocolate confections made from roasted and ground cocoa beans have been a much desired food for both adults and children for many years. Chocolate liquors and cocoa powder are used to make coatings for other foods such as candies and small cakes to offer the chocolate flavor in a less expensive, more diluted form. As cocoa beans have become more expensive, the chocolate liquor has often been diluted with fats resembling cocoa butter and called confectioner fats to make the resulting chocolate coating less expensive. To further reduce the cost of the chocolate flavor, extenders such as roasted carob bean have been added as well as much sugar filler. Such a diluted form of chocolate, however, leaves much to be desired as to color, flavor, texture and mouthfeel.

In addition, a great many synthetic cocoas and coatings as well as synthetic chocolate flavors and colors are available. Roasts of cereal grains, yeast, flours, nuts, shells etc., have been suggested as having cocoa or chocolate flavors. Most of these materials must be considered as cocoa extenders as the suggested use is in conjunction with cocoa. The patent literature relating to such synthetic cocoas has recently been reviewed in U.S. Pat. No. 4,335,153 issued to Rikon. Rikon disclosed therein a cocoa substitute whose composition is similiar to cocoa but whose coloring and flavoring depends upon synthetics, roasts as given above or from natural cocoa itself.

All of the above are very inferior to natural cocoa or chocolate flavor and color. It would be a great advantage to the confection industry if a natural material could be found, especially a natural material that could be produced domestically, that would produce confection products having color, flavor and organoleptic properties similar to chocolate.

U.S. Pat. No. 4,283,432 isued to Mitchell et al and having partially common inventorship as the present invention, disclosed a flavor powder produced from the roasted soluble extract or syrup of dahlia tubers as being useful for making beverages in hot or cold water or milk. Such flavor powders also compliment the flavor powders of coffee, tea or cocoa in blends used for making beverages.

SUMMARY OF THE INVENTION

We have now found that when the finely ground dahlia flavor powder, produced for example according to U.S. Pat. No. 4,283,432, is processed with cocoa butter or confectioner fats or the like, a superior chocolate-like confection is produced with similar color, flavor, and other physical properties.

The roasted extract or syrup of the dahlia tuber, while different in basic composition from cocoa, can be similarly blended with protein, fiber and carbohydrate powders to produce a blend similar in flavor and color to cocoa powder. The flavor blend mix can be processed with cocoa butter or confectioner fats to produce confections having aroma, color, flavor, appearance and physical properties similar to chocolate. With the incorporation of sugars or milk solids, confections analogous to unsweetened, sweet (light), semi-sweet (dark) and milk chocolate can be produced.

These confections can be substituted for regular chocolate in other foods such as beverages, baked goods, icings, coatings, candies, desserts, ice cream and syrups. The flavor mix blends can also be substituted for regular cocoa powder in other foods such as baked goods, icings, coatings, candies, desserts, ice cream and syrups.

Our confections are considered by many to be superior to chocolate itself in flavor and texture. They have the added advantage of not containing theobromine, caffeine or tannins.

It is accordingly an object of the present invention to provide a flavor powder formed from dahlia tubers for producing various confection products and a method for producing same.

It is a further object of the invention to produce chocolate type confections analogous to one or more of the following types of chocolate: basic liquors, sweet, semi-sweet, light, dark and milk chocolate.

It is a further object to produce chocolate-like confections such as baked goods, ice cream, icings, food coating, candies and syrups which include said dahlia flavor powder.

It is also an object to produce chocolate-type confections which are free from theobromine, caffeine or tannins.

It is yet a further object to make color and flavor powder blends using the dahlia flavor powder and powders of proteins, carbohydrates, fiber, minerals and vitamins.

It is an even further object to use these flavor powder blends for coloring and flavoring in bakery products, ice creams, puddings, gelatins, coatings, candies and syrups.

DESCRIPTION OF THE PREFERRED EMBODIMENT

The natural flavor powders of U.S. Pat. No. 4,283,432 obtained from the roasted water solubles of dahlia tubers are primarily 90–95% by weight fructose polymers composed of inulin and inulides. The moisture content varies between 3 to 5% by weight. The remaining material consists of small amounts of fat, protein, flavor and color bodies.

These dahlia flavor powders have been found to be very compatible with confectioner fats such as cocoa butter and vegetable fats such as palm kernel oil, soy bean oil, cotton seed oil and their mixtures. By contrast, cocoa powders and chocolate liquors must be used with fats that are compatible with cocoa butter and usually at restricted levels. The fats that are preferred to carry out our invention are cocoa butter or fats having similar physical properties which are called confectioner fats by the chocolate industry.

The proteins that are used are finely ground powders that will pass through a U. S. Standard 60 mesh screen. These can be any of the bland proteins of commerce such as soy bean protein isolate, dry milk solids and egg albumen.

Sugars such as sucrose, fructose, dextrose, lactose and hydrolyzed cereal solids of from 5 to 50 D.E. (dextrose equivalent) are used in the confection powder of the invention. Other sugars which have mild flavors such as maple sugar, turbinado sugar, date, fig and brown sugar of commerce can also be used.

Other carbohydrates that can be part of the composition include bland starches such as tapioca or potato starch or bland cereal flours such as refined wheat flour which will also contain some fiber, protein, minerals and fact. The carbohydrates are preferably in powder form fine enough to pass through a 60 mesh U. S. Standard screen.

Cellulose fibers of both unmodified and acid-unmodified types serve very well in such products. Tuber fiber of the dahlia tuber for example is very useful. Pectins and protopectins can also be used. All of the fibers should be ground to preferably pass through a 60 mesh U. S. Standard screen.

Flavor Mix Blend—Compostion

Although all ingredients of our confections can be mixed at one time, it is preferred to make a blend of some of the dry ingredients with the dahlia flavor powder. The blended mix can be used as a replacement for cocoa powder and can be incorporated with melted cocoa butter or confectioner fat to produce a dark brown slurry which can be ground further in a chocolate mill. A sugar can then be added to the desired sweetness level and the subsequent dark brown paste ground through the chocolate rolls.

Unlike normal cocoa and chocolate, the composition of our confection can vary widely. For exmaple, a good confection can be made with the following: only dahlia flavor powder, a carbohydrate and confectioner fat; only dahlia flavor powder, protein and confectioner fat; or dahlia flavor powder, fiber and a confectioner fat. It is preferred, however, for good nutrition, to make blends of the four different dry powder materials. The dry powder materials without the fat can be considered the color and flavor material similar to cocoa powder. The protein and fiber as well as the carbohydrates can be looked on as diluent material to control color and flavor levels of the dahlia flavor powder.

For the flavor mix blend, the composition by weight can vary as follows:
dahlia flavor powder 5 to 99% by weight dahlia flavor powder,
protein 1 to 50% protein by weight,
fiber 0 to 50% fiber by weight,
starches, flours, corn syrup solids 0 to 50% by weight carbohydrates such as 5–50 D.E. corn syrup solids, bland starches or flours.

For nutritional reasons levels of about 30% dry weight of both protein and fiber are preferred in the flavor mix blend. The sugar is added separately, varying with the desired sweetness of the confection, and ranges between 0 to 60% by weight of the total confection.

The composition of our confections can be prepared with the following formulations:

| dahlia flavor powder | 2–50% by weight |
| cocoa butter or confectioner fat | 20–60% by weight |
| sugar | 0–60% by weight |
| other material as fillers including starches, flours, proteins, fiber, pectins, protopectins | 0–40% by weight |

The cocoa butter or confectioner fat level of our confections can be varied from 20% to 60% by weight. The preferred level is between about 30–38% by weight.

Confections can also be made by blending the dahlia flavor powder at from 40–80% by weight with confectioner fats at 20–60% by weight. However, to decrease cost of the confections, it is desirable to operate with formulations containing a filler such as fiber, protein or carbohydrates.

Flavor enhancers such as vanilla and table salt can be added to the flavor mix blend. The flow properties of the confection can be regulated by the use of about 0.5% lecithin by weight of the total confection. As expected, the higher the concentration of the dahlia flavor powder used, the greater the flavor impact. The Federal Standard of Identity classifies chocolate as light, medium dark, dark, bittersweet and liquors from the flavor impact they have. In our case, the liquors are equivalent to a confection consisting of our basic dahlia powder processed with cocoa butter or confectioner fat. The dahlia flavor and coloring powder do not have any bitterness as do cocoa powder so our product does not require sugar to overcome bitterness. It should be stressed that the composition of our cocoa-like powders or chocolate-like confections depends upon the intended use of that powder or confection.

Blending and Grinding and Cooling

After the dry flavor mix is made, it is incorporated with melted cocoa butter or confectioner fat and sugar if desired employing the common mixers such as the Hobart mixer. The mixed slurry is then milled on chocolate rolls such as the 3 roll Ross Mill. The rolls are adjusted to a pinched position, that is, so no light can be seen through them. The slurry is ground until smooth to the tongue, that is, to particles of about 30 microns in diameter. The ground slurry is poured into molds and allowed to harden at about 75 degrees F.

Having described our flavor mix blends and confections, their compositions and how they can be produced, we will now give details by examples.

EXAMPLE 1

Preparation of a Light Confection From the Dahlia Flavor Powder

To 20 grams of dahlia flavor powder of U.S. Pat. No. 4,283,432 was added 76 grams of melted cocoa butter, 0.8 gram of lecithin, and 0.2 gram of vanilla extract. The mixture was mixed in a Hobart blender. To that mixture was added 51.8 grams of dextrose and after mixing again in a Hobart blender, the resulting paste was ground through a Ross Mill with the rolls adjusted to a pinched position. The remaining dextrose (51.4 grams) was added to the ground slurry and again the material was put through the Ross Mill. The resultant flowable confection was poured into plastic molds and allowed to set-up at 75 degrees Fahrenheit. After hardening for sixteen hours, the confection was found to have physical and organoleptic properties similar to a light chocolate.

EXAMPLE 2

Preparation of Dahlia Flavor Powder Blend Using Fiber and Protein

To 50 grams of dahlia flavor powder of U.S. Pat. No. 4,283,432 was added 22 grams of cellulose fiber and 28 grams of soy protein isolate. The powder mixture was then placed in a V-type blender and thoroughly mixed for 5 minutes. The resultant light brown powder was sifted through 60 mesh U.S. Standard screen. The powder was subsequently used to produce a light confection via the procedure described in EXAMPLE 8. The confection made was found to have physical and organoleptic properties similar to a light chocolate.

EXAMPLE 3

Preparation of a Dahlia Flavor Powder Blend Using Milk Powder

To 50 grams of dahlia flavor powder of U.S. Pat. No. 4,283,432 was added 22 grams of cellulose fiber and 28 grams of non-fat dry milk. The powder mixture was then placed in a V-type blender and thoroughly mixed for 5 minutes. The resultant light brown powder was sifted through a 60 mesh U.S. Standard screen. It was subsequently used to produce a light confection via the procedure described in EXAMPLE 8. The confection was found to be similar to milk chocolate in color, flavor and physical properties.

EXAMPLE 4

Preparation of Dahlia Flavor Powder Blend Using Maltodextrin, Vitamin C and Calcium Carbonate To 50 grams of dahlia flavor powder of U.S. Pat. No. 4,283,432 was added 22 grams of cellulose fiber, 0.15 gram of ascorbic acid, 8 grams of calcium carbonate, and 19,85 grams of a 5 D.E. maltodextrin. The powder mixture was blended in a V-type blender for 5 minutes. The resultant light brown powder was sifted through a 60 mesh U.S. Standard screen and subsequently used to produce a light confection via the procedure described in EXAMPLE 8. The confection produced was found to be similar to a light chocolate in physical properties, aroma, taste, and color.

EXAMPLE 5

Preparation of a Liquor from Dahlia Flavor Blend

To 47 grams of the dahlia flavor powder blend of EXAMPLE 2 was added 53 grams of cocoa butter which had been melted. The resultant dark slurry was passed through a 3 roll Ross Mill at a pinched roll setting such that no light could be seen coming through the rolls. The liquor (with an average particle size of about 30 microns) was then allowed to set up at 75 degrees Fahrenheit for sixteen hours. After hardening, the dark brown product was found to have most of the physical properties of unsweetened chocolate and to be organoleptically similar to chocolate liquor or unsweetened chocolate. The product consisted of the following composition by weight; 23.5% dahlia flavor powder, 10.3% cellulose fiber, 13.2% soy protein isolate and 53% cocoa butter.

EXAMPLE 6

Preparation of a Liquor from Dahlia Flavor Powders

To 40 grams of dahlia flavor powder of U.S. Pat. No. 4,283,432 was added 60 grams of melted cocoa butter. The resultant dark slurry was then passed through a 3 roll Ross Mill. The liquor (with an average particle size of about 30 microns) was then allowed to set-up at 75 degrees Fahrenheit. After 16 hours, the liquor was found to be similar to chocolate liquor or unsweetened chocolate.

EXAMPLE 7

Preparation of a Light Confection from a Liquor made with a Dahlia Powder Flavor Blend To 36 grams of dahlia flavor powder liquors which had been melted over low heat (110–120 degrees Fahrenheit) was added 19 grams of melted cocoa butter, 0.4 gram lecithin and 0.1 gram of vanilla. To this slurry was added 43.5 grams of maple sugar and the mixture blended in a Hobart blender then passed through a 3 roll Ross Mill. The flowable confection was allowed to set-up at 75 degrees Fahrenheit for 16 hours. The resultant confection was organoleptically similar to light chocolate.

EXAMPLE 8

Preparation of a Light Confection From a Flavor Powder Blend

To 18 grams of a dahlia flavor powder blend as described in EXAMPLES 2, 3 and 4, was added 38 grams of melted cocoa butter, 0.4 gram lecithin, and 0.1 gram vanilla extract. The mixture was placed in a Hobart blender and mixed. The resultant slurry was then put through a 3 roll Ross Mill. To this slurry was added 43.5 grams of dextrose and the mixture was again mixed in a Hobart blender then passed again through the 3 roll Ross Mill. The average particle size of the resultant confections was about 30 microns. The confections that were prepared from all three flavor blends were found to be similar to a light or milk chocolate in physical properties, color, aroma and taste.

EXAMPLE 9

Preparation of a Dark Confection

To 33 grams of dahlia flavor powder blend described in EXAMPLE 2 was added 38 grams of melted cocoa butter, 0.4 gram lecithin, and 0.1 gram vanilla extract. The mixture was blended in a Hobart blender and passed through a 3 roll Ross Mill. To this liquor was added 28.5 grams of fructose, the mixture blended in a Hobart blender and again passed through the 3 roll Ross Mill. The confection was allowed to set-up at 75 degrees Fahrenheit for sixteen hours. The resultant confection was found to be similar to a dark or bittersweet chocolate in color, flavor and physical properties.

EXAMPLE 10

Preparation of a Dark Confection using Fractionated Palm Kernel Oil as a Confectioner Fat A procedure identical to that described in EXAMPLE 9 was used with the exception that Fractionated Palm Kernel Oil was used in place of the cocoa butter. The resultant confection was found to be similar to a dark or bittersweet chocolate in color, aroma, taste and physical properties.

EXAMPLE 11

Preparations of Brownies Using Dahlia Flavor Powder Liquor

To 56 grams of melted liquor prepared in EXAMPLE 5 was added 76 grams of melted butter and 1 gram of vanilla extract. The mixture was slowly added to a second mixture containing 2 well beaten eggs and 100 grams of sucrose. To the resultant mixture was added a third mixture containing 100 grams of unsifted all purpose flour, 0.5 gram baking powder, and 0.25 gram salt.

After mixing thoroughly, the batter was poured into a greased 8 inch square pan and allowed to bake in an oven at 350 degrees Fahrenheit for 20 minutes. After cooling, the brownies were found to be slightly lighter in color but otherwise organoleptically similar to chocolate brownies.

EXAMPLE 12

Preparation of Flavored Milk using a Dahlia Powder Confection

To 225 grams of milk was added 15 grams of the dark confection described in EXAMPLE 9. The mixture was allowed to heat at 180 degrees Fahrenheit with constant stirring until all of the dark confection had melted. The resultant beverage was similar to that of hot chocolate prepared from a bittersweet chocolate.

EXAMPLE 13

Preparation of Pudding Mix Using a Dahlia Flavor Powder Blend

To 25 grams of flavor powder blend described in EXAMPLE 2 was added 20 grams cornstarch and 50 grams of sucrose. The mixture was blended in a V-type blender for 5 minutes. The resultant light brown powder was sifted through a 60 mesh U.S. Standard screen. The powder was subsequently mixed with 450 ml of cold milk and stirred constantly on a stove burner until the mixture boiled. After thickening, the mixture was removed from the stove and allowed to cool. After cooling, the pudding had properties similar to the color, taste, aroma, and appearance of a chocolate pudding.

Although a number of examples have been disclosed relating to the use of dahlia flavor powders in various confection products, it will be obvious that many other variations are also possible. Accordingly, the present invention is limited only by the following appended claims.

What is claimed is:

1. A confection product comprising about 2–50% by weight powdered roasted dahlia tuber syrup, about 0–60% by weight sweetener and about 20–60% by weight confectioner fat.

2. The confection product of claim 1 wherein said powdered roasted dahlia tuber syrup is intially blended with said sweetner and confectioner fat said, blend is formed into a slurry and said slurry is ground until smooth to the tongue and allowed to cool.

3. The confection product of claim 2 wherein said confection product is cooled to about 75 degrees Fahrenheit.

4. The confection product of claim 1 wherein said confectioner fat is selected from the class consisting of cocoa butter, palm kernel oil, soy bean oil, cotton seed oil and mixtures thereof.

5. The confection product of claim 1 wherein said sweetener is selected from the class consisting of sucrose, dextrose, fructose, lactose, corn syrup solids of 5–50 D.E., brown sugar, maple sugar, turbinado sugar, date sugar, fig sugar, and mixtures thereof.

6. The confection product of claim 1 wherein said powdered roasted dahlia tuber syrup is formed by grinding, pressing and filtering dahlia tubers in order to extract the water soluble solids in about 15%–25% concentration by weight from insoluble solids, concentrating said extract to a thick syrup or solid of from about 70% to 99% solids at a temperature of about 50° C. to 110° C., roasting said concentrated extract between about 102° C. and 225° C. for about 3 minutes to 2 hours, and then grinding to a powder.

7. A confection product comprising a blend of about 2–50% by weight powdered roasted dahlia tuber syrup, about 1–40% by weight filler powder selected from the group consisting of fiber, protein, starch, bland flour, pectin, protopectin and mixtures thereof and about 20–60% by weight confectioner fat.

8. The confection product of claim 7 wherein the blend of confection components are formed into a slurry which is ground and cooled.

9. The confection product of claim 7 wherein said confection fat is selected from the class consisting of cocoa butter, palm kernel oil, soy bean oil, cotton seed oil and mixtures thereof.

10. The confection product of claim 7 wherein said filler powder consists of blends of about 1–99% by weight of fiber and protein.

11. The confection product of claim 7 wherein said filler powder comprises a blend of about 1–99% by weight of fiber and pectin.

12. A confection product comprising about 2–50% by weight powdered roasted dahlia tuber syrup, about 20–60% by weight confectioner fat, about 0–60% sweetener and about 0–40% by weight filler powder selected from the group consisting of fiber, protein, starch, bland flour, pectin, protopectin and mixtures thereof.

13. The confection product of claim 12 wherein said confectioner fat is selected from the class consisting of cocoa butter, palm kernel oil, soy bean oil, cotton seed oil and mixtures thereof.

14. The confection product of claim 12 wherein said sweetener is selected from the class consisting of sucrose, dextrose, fructose, lactose, corn syrup solids of about 5–50 D.E., brown sugar, maple syrup, turbinado sugar, date sugar, fig sugar and mixtures thereof.

15. The confection product of claim 12 wherein said filler powder comprises a combination of fiber and protein.

16. The confection product of claim 12 wherein said filler powder comprises a mixture of protein and pectin.

17. The confection product of claim 12 wherein said powdered roasted dahlia syrup, confectioner fat, sweetener and filler powder are blended to form a slurry, grinding said slurry until it is smooth to the tongue when tasted, then cooling the slurry.

18. A confection product comprising about 5–99% by weight powdered roasted dahlia tuber syrup, about 1–50% by weight protein, about 0–50% by weight fiber and about 0–50% by weight carbohydrate.

19. The confection product of claim 18 wherein said carbohydrate is selected from the class consisting of cereal solids of about 5–50 D.E., starch, flour and mixtures thereof.

20. The confection product of claim 18 wherein the combination of said powdered roasted dahlia syrup, protein, fiber and carbonhydrate comprises about 10–50% by weight of the total confection mixture, said mixture further comprising about 0–60% by weight sweetener and about 20–60 % by weight confectioner fat wherein said confection mixture is blended into a slurry which is ground until smooth to the tongue and allowed to cool to form the confection product.

21. A confection product comprising about 40–80% by weight of powdered roasted dahlia tuber syrup formed by grinding, pressing and filtering dahlia tubers in order to extract the water soluble solids in about 15-25% concentration by weight from insoluble solids, concentrating said extract to a thick syrup or solid of from about 70-99% solids at a temperature of about 50-110° C., roasting said concentrated extract between about 102-225 C. for about 3 minutes to 2 hours and then grinding to a powder, the confection product further comprising about 20-60% by weight confectioner fat.

22. A light chocolate-like confection product comprising about 15-25% by weight of a dahlia flavor powder mix having about 40-60 parts powdered roasted dahlia tuber syrup, about 15-30 parts cellulose fiber and about 20-35 parts soy protein isolate, about 35-50% by weight sweetener, about 0.1-2% by weight lecithin, about 0-0.5 by weight percent vanilla extract and about 30-45% by weight confectioner fat.

23. The light chocolate-like confection product of claim 22 wherein said dahlia flavored powder mix, sweetener, lecithin, extract and confectioner fat are formed into a slurry and ground until smooth to the tongue, then cooled.

24. The light chocolate-like confection product of claim 23 further comprising about 18% by weight of said dahlia flavored powder mix having about 50 parts powdered roasted dahlia tuber syrup, about 22 parts cellulose fiber and about 28 parts soy protein isolate, about 43.5% sweetener, about 0.4% by weight lecithin, about 0.1% by weight vanilla extract and about 38% by weight of confectioner fat.

25. An unsweetened chocolate-like liquor comprising about 40-60% by weight of a dahlia flavored powder mix having about 40-60 parts powdered roasted dahlia tuber syrup, about 15-30 parts cellulose fiber and about 20-35 parts soy protein isolate, and about 45-65% by weight confectioner fat wherein said dahlia flavored powder mix and said confection fat are formed into a slurry which is ground until smooth to the tongue and then cooled.

26. The unsweetened chocolate-like liquor of claim 25 comprising about 47% by weight of said dahlia flavored powder mix having about 50 parts powdered roasted dahlia tuber syrup, about 22 parts cellulose fiber and about 28 parts soy protein isolate, and about 53% by weight confectioner fat.

27. A dark chocolate-like confection product comprising about 25-40% by weight of a dahlia flavored powder mix having about 40-60 parts powdered roasted dahlia tuber syrup, about 15-30 parts cellulose fiber and about 20-35 parts soy protein isolate, about 20-35% by weight sweetener, about 0.1-2% by weight lecithin, about 0-0.5% by weight vanilla extract and about 30-45% by weight confectioner fat wherein said dahlia flavored powder mix, sweetener, lecithin, vanilla extract and confectioner fat are formed into a slurry which is ground until smooth to the tongue and then cooled.

28. The dark chocolate-like confection product of claim 27 comprising about 33% by weight of said dahlia flavored powder mix having about 50 parts powdered roasted dahlia tuber syrup, about 22 parts cellulose fiber and about 28 parts soy protein isolate, about 28.5 by weight sweetener, about 0.4% by weight lecithin, about 0.1% by weight vanilla extract and about 38% by weight confectioner fat.

29. A milk chocolate-like confection product comprising about 20-35% by weight of a dahlia flavored powder mix having about 40-60 parts powdered roasted dahlia tuber syrup, about 15-30 parts cellulose fiber and about 20-35 parts non-fat dry milk, about 25-40% by weight sugar, about 0.1-2% by weight lecithin, about 0-0.5% by weight vanilla extract wherein said dahlia flavored powder mix blended into a slurry with about 30-45% by weight confectioner fat to form a slurry which is ground until smooth to the tongue and then cooled.

30. The milk chocolate-like confection product of claim 29 comprising about 28% by weight of said dahlia flavored powder mix having about 50 parts powdered roasted dahlia tuber syrup, about 22 parts cellulose fiber and about 28 parts non-fat dry milk, about 33.5% by weight sweetener, about 0.4% by weight lecithin, about 0.1% by weight vanilla extract and about 38% by weight confectioner fat.

31. A confection product free of caffeine, theobromine and tannin, comprising about 2-50% by weight roasted dahlia tuber syrup, about 20-60% by weight confectioner fat, about 0-60% by weight sweetener, about 0-20% by weight fiber and about 0-20% by weight protein.

* * * * *